AUTOMATIC PHASE CONTROL SYSTEM FOR ESTABLISHING A REFERENCE CARRIER

Filed Dec. 16, 1965

INVENTOR
J. S. RONNE
BY Leonard D. Arnold
ATTORNEY 3,411,092
AUTOMATIC PHASE CONTROL SYSTEM FOR ESTABLISHING A REFERENCE CARRIER
James S. Ronne, Groveland, Mass., assignor to Bell Telephone Laboratories, Incorporated, New York, N.Y., a corporation of New York
Filed Dec. 16, 1965, Ser. No. 514,357
4 Claims. (Cl. 325—444)

This invention relates to automatic phase control circuits and more particularly to automatic phase control circuits for use in wideband data transmission systems.

One way of detecting amplitude modulated signals is by means of synchronous detection. This involves modulating the amplitude modulated received signal with a local source of carrier which has the same frequency and phase as that associated with the received signal.

To accomplish such detection requires the establishment and maintenance of a local carrier signal and one technique for doing so is described on page 255 (FIG. 13–3) of Data Transmission by Bennett and Davey, published by the McGraw-Hill Book Company. Using the technique described by Bennett and Davey, the very low information signal frequencies are removed by a high pass network before modulation and a carrier pilot added before transmission. As a result no spectrum of information signals is formed in a narrow band adjacent to the carrier frequency and this permits the detection of the inserted reference carrier pilot at the receiver without interference from the information signal. Before demodulation can be effected, however, the phase and frequency of the received carrier must be the same as that of the inserted carrier, and in the past this has generally been accomplished by means of a phase locked oscillator circuit at the receiving terminal.

While generally satisfactory, phase locked oscillators suffer from their inability to maintain small phase errors at the receiver in the presence of large phase instability in the transmission medium. In addition, they are fairly complex and expensive, and relatively sensitive to "breaking lock" since they determine the frequency as well as the phase of the carrier generated at the receiver.

Filters to select the carrier pilot have also been employed in such transmission systems. Unfortunately, filters, while better able to maintain small errors at the receiver in the presence of large phase instability in the transmission medium and avoiding the above mentioned problem of "breaking lock" may introduce a phase error in the carrier pilot. This error is not constant but is a function of the frequency of the carrier pilot, temperature, humidity, aging, and it has been discovered carrier pilot phase instability.

It is an object of this invention to reduce the phase error introduced by a carrier pilot filter.

In accordance with this invention a carrier of reduced amplitude is transmitted in proper phase for demodulation and a crystal filter is used at the receiver to isolate the received carrier with the output of the filter passed through a voltage controlled phase shifter whose output is in turn applied to one input terminal of a phase detector. The received signals are also applied to the phase detector which generates a D-C error signal proportional to the phase difference between the output of the voltage controlled phase shifter and the received carrier pilot which error signal is applied to the phase shifter to correct the phase error introduced by the crystal filter and maintain the output of the phase shifter in the proper relationship with the received carrier. The phase of the recovered carrier may then be shifted by a phase shifter and the resulting signal applied to a synchronous detector.

This invention will be more fully comprehended from the following detailed description taken in conjunction with the drawings in which.

Figure 1:
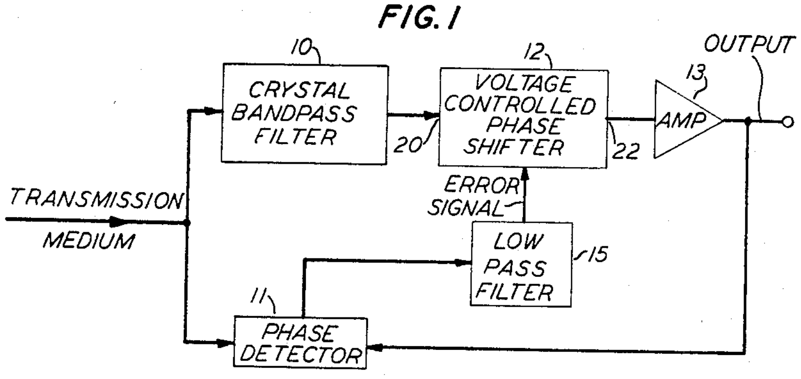
FIG. 1 is a block diagram of an automatic phase control circuit embodying this invention.

An automatic phase control circuit embodying this invention for maintaining the phase of a recovered carrier signal in quadrature with a received carrier is shown in FIG. 1. The received signal comprises both the modulated information signal and a carrier pilot which has been inserted at the transmitter and these signals are applied to both a crystal bandpass filter 10 and a phase detector circuit 11. The function of the crystal bandpass filter 10, which may be that shown in Electro-Mechanical Transducers and Wave Filters by W. P. Mason, second edition, page 262, Fig. 8.13, published by the D. Van Nostrand Company Inc., is to isolate the carrier pilot while suppressing the other signals.

The crystal filter described by W. P. Mason in his above-mentioned text produces a nominal phase shift of 90 degrees, but also usually has the adverse effect of adding a phase error to the carrier pilot. This error is not constant but is a function of the frequency of the carrier pilot, temperature, humidity, aging, and carrier pilot phase instability.

The phase error introduced by the filter 10 is minimized by using the phase detector 11 to compare the phase of the carrier at the output terminal 22 of a voltage controlled phase shifter with the phase of the received carrier pilot. Toward this end the derived carrier at the output of the filter 10 is applied to the input terminal 20 of a voltage controlled broadband phase shifter 12, which in response to an external error signal generated by phase detector 11 changes the phase of the derived carrier pilot at its output terminal 22. A phase detector capable of operating in this manner is described in Modulators and Frequency Changers for Amplitude Modulated Line and Radial Systems, by D. G. Tucker, published by MacDonald & Co., Ltd., page 68, Fig. 20.

In somewhat more detail in this embodiment of the invention, the error signal applied to the broadband phase shifter 12 is used to maintain the phase of the recovered carrier signal in quadrature with the received carrier pilot. This error signal is generated by the phase detector 11 to which the received signal as well as the output of the phase shifter 12 amplified by amplifier circuit 13 are applied. The error signal is first applied to a low pass filter 15 which reduces any information signals which are present near the carrier pilot frequency and thence to the phase shifter 12 to minimize any phase error introduced by the crystal filter 10, and maintain the output of amplifier 13 in quadrature with the received carrier pilot.

Figure 2:
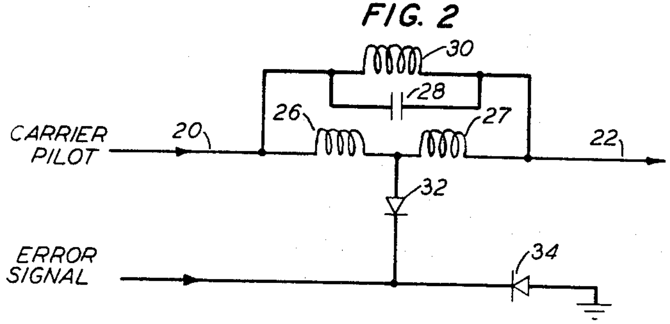
FIG. 2 is a schematic diagram of the phase shifter shown in block diagram form in FIG. 1.
Figure 3:
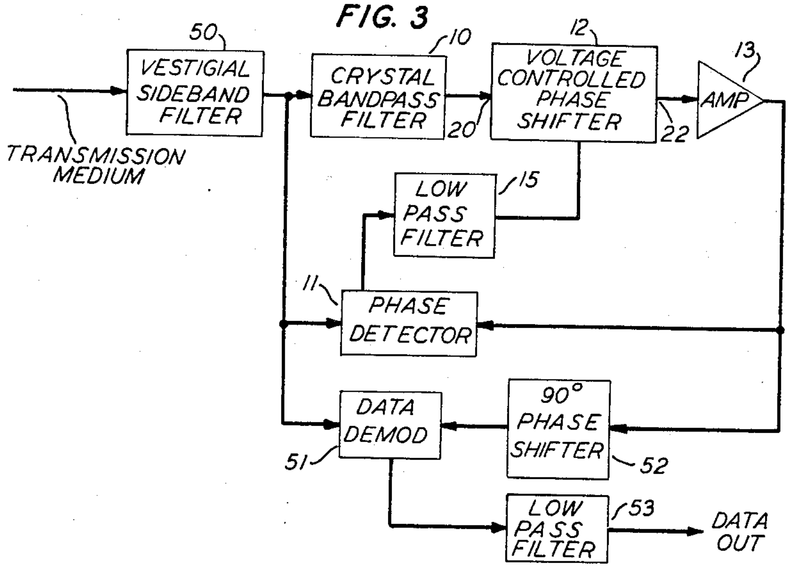
FIG. 3 is a block diagram of a data receiving terminal employing synchronous detection and an automatic phase control circuit embodying this invention.

A schematic diagram of the voltage controlled phase shifter designed to operate in conjunction with a crystal filter 10 having a nominal 90 degree phase shift is shown in FIG. 2. It comprises a series parallel circuit connected between the carrier pilot input terminal 20 and the carrier pilot output terminal 22. The series portion of this circuit comprises inductors 26 and 27 connected between terminals 20 and 22 together with a parallel circuit comprising capacitor 28 and inductor 30 also connected between input terminal 20 and output terminal 22. Connected between ground and the junction of inductors 26 and 27 is a parallel circuit comprising varactor diode 32 and varactor diode 34. This phase shifter circuit produces a nominal 180 degree phase shift which is varied from its nominal value by the change in capacitance of the varactor diodes 34 and 32 as an error signal applied to the junction of varactor diode 32 and diode 34 is varied. The resulting nominal phase shift through the path, shown in FIG. 1, comprising a filter 10, having a nominal 90 degree phase shift, and the phase shifter 12, shown in FIG. 3, is 270 degrees, and the phase detector 11 operates to maintain the resulting quadrature relationship between the output of amplifier 13 and the received carrier pilot. Obviously, where a crystal filter 10 having a nominal phase shift substantially different than 90 degrees is used, then a phase shifter having a suitable phase shift to create the nominal quadrature relationship between the received and recovered carrier must be employed. The design of such phase shifters is known in the art.

Thus, where an automatic phase control circuit embodying this invention is employed, phase errors in the recovered carrier introduced by the use of a filter at the receiving terminal are reduced, thus facilitating the use of such filters and eliminating the need for a local phase locked oscillator at the receiving terminal with its inherent problems of breaking lock, relatively large error in the face of phase instability in the transmission medium and relatively high cost.

The receiving terminal of a vestigial sideband data transmission system, of the general type described on page 255 by Bennett and Davey in the above-mentioned text, in which the carrier pilot is inserted in phase with the data carrier, and embodying this invention, is shown in FIG. 3.

The incoming modulated data signals and carrier pilot are applied to a vestigial sideband filter 50 which shapes the vestigial sideband signal and limits the noise bandwidth. The resulting band-limited signal, which includes the carrier pilot, is applied simultaneously to the crystal bandpass filter 10, the phase detector 11, and a data demodulator 51. The automatic phase control circuit comprising crystal bandpass filter 10, phase detector 11, voltage controlled phase shifter 12, amplifier 13, and low-pass filter 15 functions as above described to keep the recovered carrier signal in quadrature with the carrier pilot. A 90 degree phase shifter 52, connected to the output of amplifier 13, then changes the phase of the recovered carrier an additional 90 degrees to provide the proper signal for synchronously detecting the data signal in data demodulator 51. The output of the data demodulator is passed through a low-pass filter 53 wherein the upper sideband and other unwanted modulation products are removed.

It is to be understood that the above-described arrangements are illustrative of the applications of the principles of the invention. Numerous other arrangements may be devised by those skilled in the art without departing from the spirit and scope of the invention.

What is claimed is:

1. In a receiver for modulated signals including a carrier, a narrow bandpass filter for selecting the carrier, a voltage controlled phase shifter connected to the output of said filter, a phase detector supplied with the incoming carrier and the output of said voltage controlled phase shifter to generate a signal determined by the phase difference of the two inputs, and means for controlling said phase shifter with the output signal from said phase detector.

2. In a receiver for amplitude modulated signals including a carrier of reduced amplitude, a narrow bandpass crystal filter for selecting the carrier, a voltage controlled variable phase shifter connected to the output of said filter to correct for the phase error introduced in said carrier by said crystal filter, a phase detector supplied with the incoming carrier and the output of said phase shifter to generate a signal determined by the phase difference of the two inputs, and means for controlling said phase shifter with the output signal from said phase detector.

3. In a transmission system in which a carrier signal is transmitted, means at the receiver for recovering the transmitted carrier comprising, in combination, a crystal filter for selecting the carrier, a voltage controlled variable phase shifter having an input terminal, an output terminal and a control terminal, said input terminal being connected to receive the carrier signal derived by said filter, a phase detector having input terminals and an output terminal, means connecting the output terminal of said phase shifter to one input terminal of said phase detector, means connecting the second input terminal of said phase detector to receive the transmitted carrier so that the signal appearing at the output terminal of said phase detector is an error signal representing the difference in phase between the received carrier signal and the output signal from said crystal filter, and means connecting the output terminal of said phase detector to the control terminal of said phase shifter to shift the phase of the output signal of said filter so that the signal present at the output terminal of said phase shifter has a predetermined phase relative to the transmitted carrier signal.

4. In a data transmission system in which a carrier of reduced amplitude is transmitted in phase with the modulated data and synchronous detection is employed at the receiving terminal, means at the receiver for recovering the carrier comprising, in combination, a crystal filter having an input terminal connected to receive the signals transmitted over said transmission system to derive said carrier at its output terminal, a voltage controlled variable phase shifter having an input terminal, an output terminal, and a control terminal, said input terminal being connected to receive the output signals from said filter, a phase detector having two input terminals and an output terminal, means connecting the output terminal of said phase shifter to one input terminal of said phase detector, means connecting the second input terminal of said phase detector to receive the transmitted data signals and the transmitted carrier signal so that the signal appearing at the output terminal of said phase detector is an error signal representing the difference in phase between the received carrier signal and the output signal from said phase shifter, means connecting the output terminal of said phase detector to said control terminal of said phase shifter to shift the phase of the output signal of said filter so that the signal present at the output terminal of said phase shifter has the correct phase relative to the transmitted carrier signal, a data demodulator having two input terminals and an output terminal, a first of said input terminals being connected to receive said transmitted signals, and means for applying the output of said phase shifter to the second input terminal of said data demodulator so that demodulated data signals appear at its output terminal.

No references cited.

KATHLEEN H. CLAFFY, *Primary Examiner.*

R. S. BELL, *Assistant Examiner.*